United States Patent
Svetal et al.

(10) Patent No.: US 8,733,643 B2
(45) Date of Patent: May 27, 2014

(54) SYSTEMS AND METHODS FOR PROVIDING FEEDBACK TO A USER OPERATING AN AUTOMATED CHECKSTAND

(75) Inventors: Michael P. Svetal, Eugene, OR (US); Craig D. Cherry, Eugene, OR (US); Jeffrey J. Hoskinson, Eugene, OR (US); WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 59 days.

(21) Appl. No.: 13/357,573

(22) Filed: Jan. 24, 2012

(65) Prior Publication Data

US 2012/0187194 A1    Jul. 26, 2012

Related U.S. Application Data

(60) Provisional application No. 61/435,741, filed on Jan. 24, 2011.

(51) Int. Cl.
*G07G 1/01* (2006.01)
*G06G 1/00* (2006.01)
*G06Q 20/20* (2012.01)

(52) U.S. Cl.
CPC ............ *G06G 1/0063* (2013.01); *G06Q 20/208* (2013.01)
USPC ........................................................ 235/383

(58) Field of Classification Search
USPC ........................................................ 235/383
See application file for complete search history.

(56) References Cited

U.S. PATENT DOCUMENTS

| | | | |
|---|---|---|---|
| 4,575,623 A | 3/1986 | Cononi et al. | |
| 4,676,343 A * | 6/1987 | Humble et al. | 186/61 |
| 4,939,355 A | 7/1990 | Rando et al. | |
| 5,491,328 A | 2/1996 | Rando | |
| 5,679,941 A * | 10/1997 | Iizaka et al. | 235/383 |
| 5,723,852 A | 3/1998 | Rando et al. | |
| 5,869,827 A | 2/1999 | Rando | |
| 5,978,772 A | 11/1999 | Mold | |
| 6,189,784 B1 | 2/2001 | Williams | |
| 6,223,986 B1 | 5/2001 | Bobba et al. | |
| 6,446,870 B1 | 9/2002 | Rando | |
| 7,337,960 B2 | 3/2008 | Ostrowski et al. | |
| 2009/0134221 A1* | 5/2009 | Zhu et al. | 235/383 |
| 2010/0145504 A1* | 6/2010 | Redford et al. | 700/227 |
| 2010/0217678 A1* | 8/2010 | Goncalves | 705/22 |

FOREIGN PATENT DOCUMENTS

JP    05-307635 A    11/1993

OTHER PUBLICATIONS

International Search Report, PCT/US2012/022449, Aug. 9, 2012.
*Supermarket News*, "Kroger Store Deploys 'Tunnel Scanner' at Checkout," http://supermarketnews.com/latest-news/kroger-store-displays-tunnel-scanner-checkout, Jul. 21, 2010.

(Continued)

*Primary Examiner* — Christle I Marshall
(74) *Attorney, Agent, or Firm* — Stoel Rives LLP

(57) ABSTRACT

Systems and methods for providing feedback to a user of an automated checkstand are disclosed. In some embodiments, the automated checkstand has a data reader including a read zone through which items to be read are passed, and a loading zone on which a user places items for conveyor transport through the read zone. The automated checkstand also has a notification system including an illumination source that is configured to selectively illuminate a portion of the automated checkstand in response to positional information associated with items previously placed on a conveyor system.

29 Claims, 10 Drawing Sheets

(56) References Cited

OTHER PUBLICATIONS cincysavers.com, "Behold, I Have Seen the Future." cincysavers.com/ . . . /advantage-checkout, Apr. 9, 2010.
Baverman, "Kroger's Fast Scanner a Retail Winner." http://news.cincinnati.com/article/20110111/BIZ01/101120344/Kroger-s-fast-scanner-retail-winner, Jan. 11, 2011.
SCDigest, "High Speed UPC Scan Tunnel at Heart of New Advantage Checkout System; Reducing Billions of Touches Annually; Bearish Bet on RFID in Grocery; What Will Kroger Do?." http://www.scdigest.com/ontarget/11-01-11-2.php?cid=4083&ctype=content, Jan. 11, 2011.

* cited by examiner

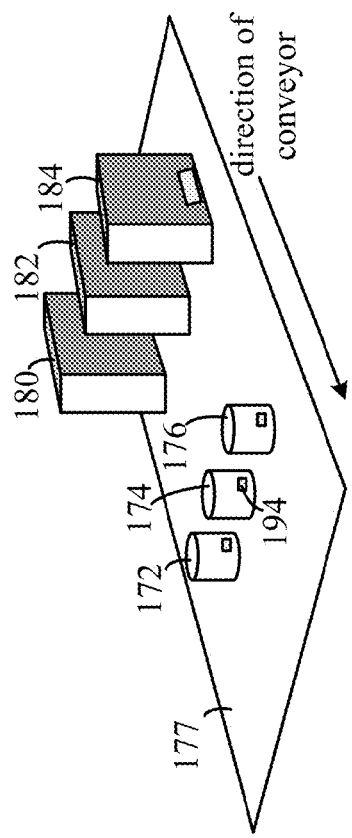
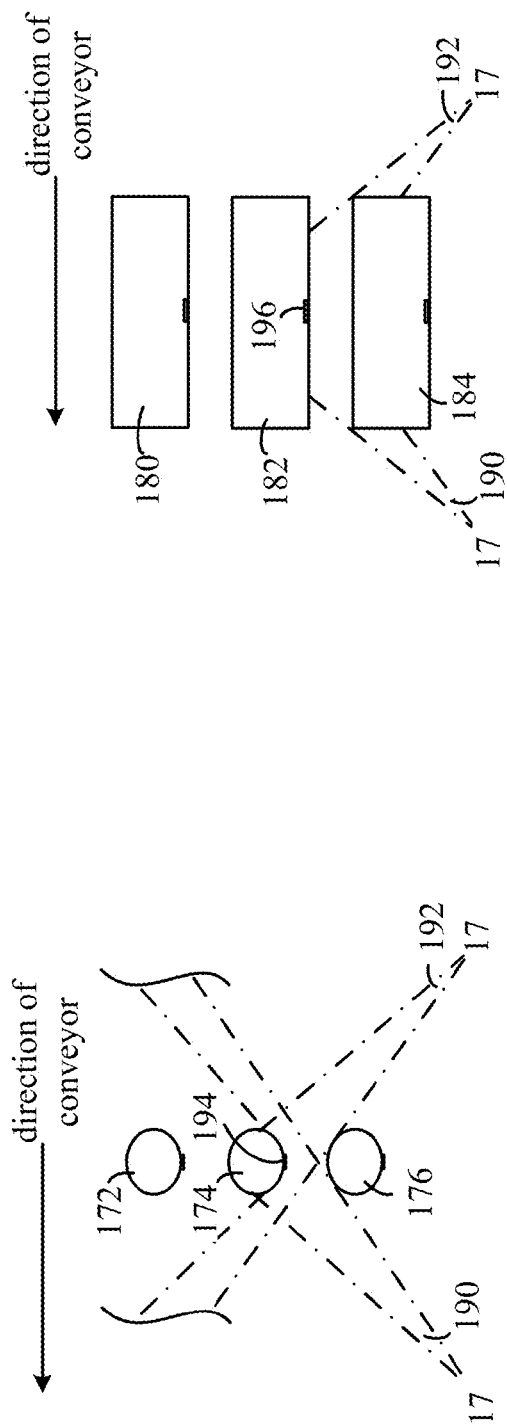

SYSTEMS AND METHODS FOR PROVIDING FEEDBACK TO A USER OPERATING AN AUTOMATED CHECKSTAND

RELATED APPLICATION DATA

This application claims the benefit under 35 U.S.C. §119(e) of U.S. Provisional Patent Application No. 61/435,741, filed Jan. 24, 2011, which is hereby incorporated by reference in its entirety.

BACKGROUND INFORMATION

The field of the present disclosure generally relates to an automated checkout stand or lane (checkstand), and more particularly to systems and methods providing feedback to a user of the checkstand.

An optical code, such as a barcode, is essentially a machine-readable representation of information in a visual format. Some optical codes use a dark ink on a white substrate to create high and low reflectance upon scanning or reading of the optical code. For the purposes of the present description, the terms scan and read may be used interchangeably to connote acquiring data associated with an optical code. Likewise, scanner and optical code reader may be used interchangeably to connote devices used to acquire data associated with an optical code. Based on the symbology being used (e.g., UPC, Code 39, Code 128, and PDF417), an optical code may comprise data characters (or codewords e.g., in the case of PDF417) and/or overhead characters represented by a particular sequence of bars and spaces that may have varying widths.

Optical codes have widespread applications. For example, optical codes can be used to identify a class of objects (e.g., merchandise) or unique items (e.g., patents). Therefore, optical codes are found on a wide variety of objects, such as retail goods, company assets, and documents. Optical codes are placed on items and read by optical code readers as the items arrive or as they are sold to help track production at manufacturing facilities or sales and inventory at stores.

Optical code readers, such as laser scanners or imager-based readers, are well known for use in scanning or reading barcodes and other types of optical codes. For example, in retail stores, optical code readers are placed at checkstands or are built into a checkstand counter and generally have one or more read volumes (scan volumes) that collectively establish a read zone in which optical codes may be successfully read. Typically, optical codes are placed on or associated with items, packages, containers or other objects and read by the optical code reader when the items bearing the optical codes are passed through the read zone.

In an assisted checkout process, a customer places items on a counter, deck, or conveyor of a checkstand; the items are transported to a checkout clerk (checker); and the checker then takes each item and moves it through the read zone of the optical code reader. Accordingly, the checker typically locates an optical code on a label of the item, and holds the label or packaging in a particular orientation to obtain a successful read of the optical code as it is moved through the read zone. Misalignment of the optical code (e.g., misaligned barcode lines), inadvertent movement of the optical code away from the read zone, an item that is not on file in an inventory database, an optical code that does not match other detected visual characteristics of the item (e.g., size or shape), or other problems that may arise during the read and data capture operation can result in a misread or a non-read of the optical code (also referred to as an exception), which slows the checkout process.

The likelihood or frequency of exceptions is exacerbated in self-checkout systems, i.e., checkout systems that do not rely on a checker to operate the optical code reader. Users (such as checkers, or customers) of conventional semi-automatic self-checkout systems may not have sufficient experience using the optical code reader, or may have difficulty in locating and positioning optical codes in a read zone for producing successful data reads.

Prior attempts to minimize or eliminate the participation of customers and checkers using automated self-checkout barcode scanners have included a device described in U.S. Pat. No. 4,939,355 (Rando '355). According to Rando '355, an item is placed by a customer onto a conveyor belt and it is transported by the conveyor to an automated scanning device. However, these prior devices occasionally fail to achieve a successful scan on the first pass of the item through a scan zone because of the wide variations in product sizes, irregularities of packaging shapes, differing locations of barcodes, and due to larger items shadowing neighboring items. These exceptions necessitate rescanning, often with handheld scanners, in order to obtain data associated with the barcodes on packages that generate exceptions.

To reduce the likelihood of exceptions, previous automated checkstands relied principally on adequate inter-item separation distance, i.e., item singulation. However, customers usually had no intuitive way of knowing when, where, or how to place items on a checkstand conveyor to ensure that the items were properly singulated, and thereby decrease the likelihood of exceptions. Rudimentary attempts to enforce proper item singulation relied on simple gating mechanisms that controlled belts to convey items serially into a scan zone. In other words, these systems used a gating signal that would only allow one item (i.e., one barcode) into a scan zone at a time during the valid period of the gating signal.

Aside the serial processing, one disadvantage of these previous gating configurations was that they could only detect improper item singulation after items had reached the scan volume. In other words, customers could initially load an input conveyor improperly, thereby generating an initial exception when the previously loaded items were conveyed to the scan zone. Another disadvantage was that items had to be spaced apart by at least the length of the scan zone because the gating signal started when an item first blocked a first optical eye upon entry into the scan zone, and would end when a second optical eye on an opposite side of the scan zone became unblocked. This fixed separation distance frequently created large and unnecessary inter-item spacing, which limited throughput.

Conventional automated checkstands occasionally provided rudimentary instructions on display screens that instructed customers. However, the present inventors have realized that customers who either could not read or simply preferred to skip the instructions had no intuitive way of knowing how to properly load and singulate items on a conveyor in order to decrease the likelihood of generating an exception. Users accustomed to using self-checkout checkstands are typically provided a tone or other signal when the item's optical code is read. However, automated checkstands read and decode items in a read zone that is typically spaced apart some distance from the customer. Moreover, the customer may be dealing with other loading tasks while previously loaded items are successfully read (or generate exceptions) at a location farther down a conveyor. The separation of customers from the read zone, as well as a customer's multitasking while operating and loading an automated checkstand can reduce the customer's association of a tone (or other success or failure signal) with a particular item that is being read in the read zone. Furthermore, some automated checkstands include bagging areas with multiple sections, but customers may have no intuitive way of knowing what side of the checkstand they should exit for picking up their purchased items.

SUMMARY

Embodiments are disclosed that are directed to systems and methods of automated reading or identifying items, such as items bearing optical codes. In one example, an automated checkstand is provided with a loading zone on which a user (such as an operator, checker, customer, or service technician) places items for conveyor transport through a data-reading zone (read zone) of the automated checkstand. Systems and methods are provided to communicate, via a notification system, proper placement and spacing of the items placed on a conveyor, to indicate exceptions, or to direct a user to a side of the automated checkstand that corresponds to a location of a takeaway zone (e.g., a bagging area) that contains items previously transported through the read zone.

In another embodiment, an automated checkstand is disclosed comprising a loading zone configured to receive items for conveyor transport through a read zone; a conveyor system configured to transport items through the read zone; a data reader defining the read zone through which items to be read are conveyed; an item-detector device configured to detect items within the loading zone; and a notification system including an illumination source configured to selectively illuminate a portion of the loading zone in response to the item-detector device indicating transport of items away from the loading zone, and the notification system configured to dynamically adjust illumination timing based on locations of previously placed items and according to a desired inter-item separation distance between successive items detected by the item-detector device within the loading zone.

In yet another embodiment, a method of indicating a location of items in a bagging area of automated checkout system is disclosed comprising the steps of detecting an item within a loading zone of the automated checkout system; transporting the item via a conveyor system from the loading zone to a read zone of a data reader; providing multiple downstream item paths from the read zone to first and second bagging areas; and indicating to a user which of the bagging areas correspond to that user's transaction.

In still another embodiment, a method of indicating an exception occurring within a read zone of a data reader in an automated checkout system is disclosed, the method comprising the steps of detecting an item within a loading zone of the automated checkout system; transporting the item via a conveyor system from the loading zone to the read zone; determining a position of the item on the conveyor system as the item is conveyed; and activating an illumination source to progressively illuminate a portion of a fixed siderail bordering the conveyor system, the illuminated portion corresponding to the position of the item as the item is conveyed.

Additional aspects and advantages will be apparent from the following detailed description of embodiments, which proceeds with reference to the accompanying drawings.

BRIEF DESCRIPTION OF DRAWINGS

Understanding that drawings depict certain embodiments and are not therefore to be considered to be limiting in nature, the embodiments are described and explained with additional specificity and detail through the use of the accompanying drawings.

FIG. 6 is an isometric view of a first set of three similarly shaped cylindrical items uniformly spaced apart laterally across an input conveyor belt, followed by a second set of three similarly shaped rectangular items uniformly spaced apart laterally across the input conveyor belt.

FIG. 7 is a top plan view of the first set of items of FIG. 6 depicting no parallel shadowing due to sufficient item singulation.

FIG. 8 is a top plan view of the second set of items of FIG. 6 depicting parallel shadowing due to insufficient item singulation.

DETAILED DESCRIPTION OF EMBODIMENTS

Figure 1:
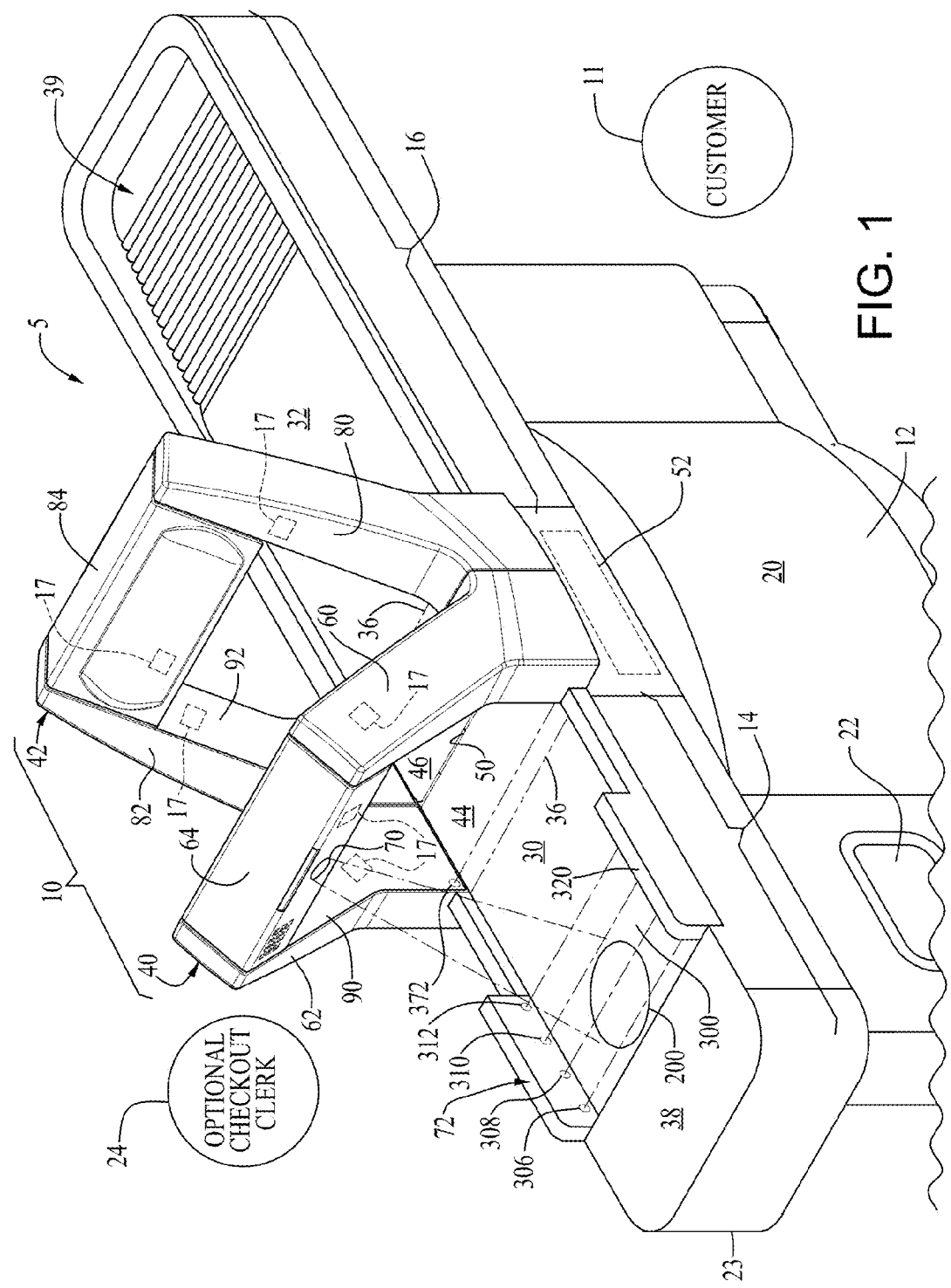
FIG. 1 is an isometric view of an automated checkstand having an integral artificial illumination source, as seen from a point of customer ingress.

With reference to the above-listed drawings, this section describes particular embodiments and their detailed construction and operation. The embodiments described herein are set forth by way of illustration only and not limitation. For the sake of clarity and conciseness, certain aspects of components, or steps of certain embodiments are presented without undue detail where such detail would be apparent to skilled persons in light of the teachings herein and/or where such detail would obfuscate understanding of more pertinent aspects of the embodiments.

For the purposes of the present description, an automated checkstand is one in which a user places an item at an input location, and the automated checkstand transports the item through a read zone of a data reader, such as an optical code reader, for unassisted reading or identifying items such as items bearing of an optical code. The data readers may establish read zones by generating one or more read volumes using laser scan lines, image-based machine vision or other visual recognition techniques, RFID, or various other item identification techniques. Conveyor belts may be used for transporting items through the read zone, although other conveyor transport structures, are possible (e.g., turntables, roller conveyors, inclined slides, vibratory conveyor systems, blower systems in which the items driven along a surface via a blower, combinations thereof, or other suitable systems).

The present inventors have developed intuitive techniques of communicating visual indications and cues to customers using an automated checkstand. Certain cues can reduce exceptions, increase throughput of items through a read zone, and decrease customer checkout times by indicating various conditions and locations of previously read items. Thus, according to certain embodiments set forth below, an automated checkstand may include integrated artificial illumination sources configured to provide feedback to a customer, checker, service technician, or other users.

According to one embodiment, an artificial illumination source is configured to provide illumination that is projected or focused onto a location of the automated checkstand. Although the illumination may be projected onto a moving conveyor, it appears to a user as a stationary location in which to load items for transport to a read zone, thereby providing an indication to customers on how to properly load items to maintain sufficient separation distance between items, such that items do not occlude each other. Unlike fixed markings (targets) on a moving belt, in which each target is spaced apart by a predetermined spacing distance, stationary illumination does not suggest to customers that they must place an item on every target, or that they should avoid missing targets as the belt moves. Customers attempting to place items on each target may become fatigued or frustrated when they actually need only place items intermittently on targets to maintain proper separation. Furthermore, the minimum separation between fixed targets cannot be readily adjusted to change the item-placement indication that a customer receives, nor can the fixed target spacing be dynamically adjusted according to conveyor belt speed or customers' loading speeds.

Figure 2:
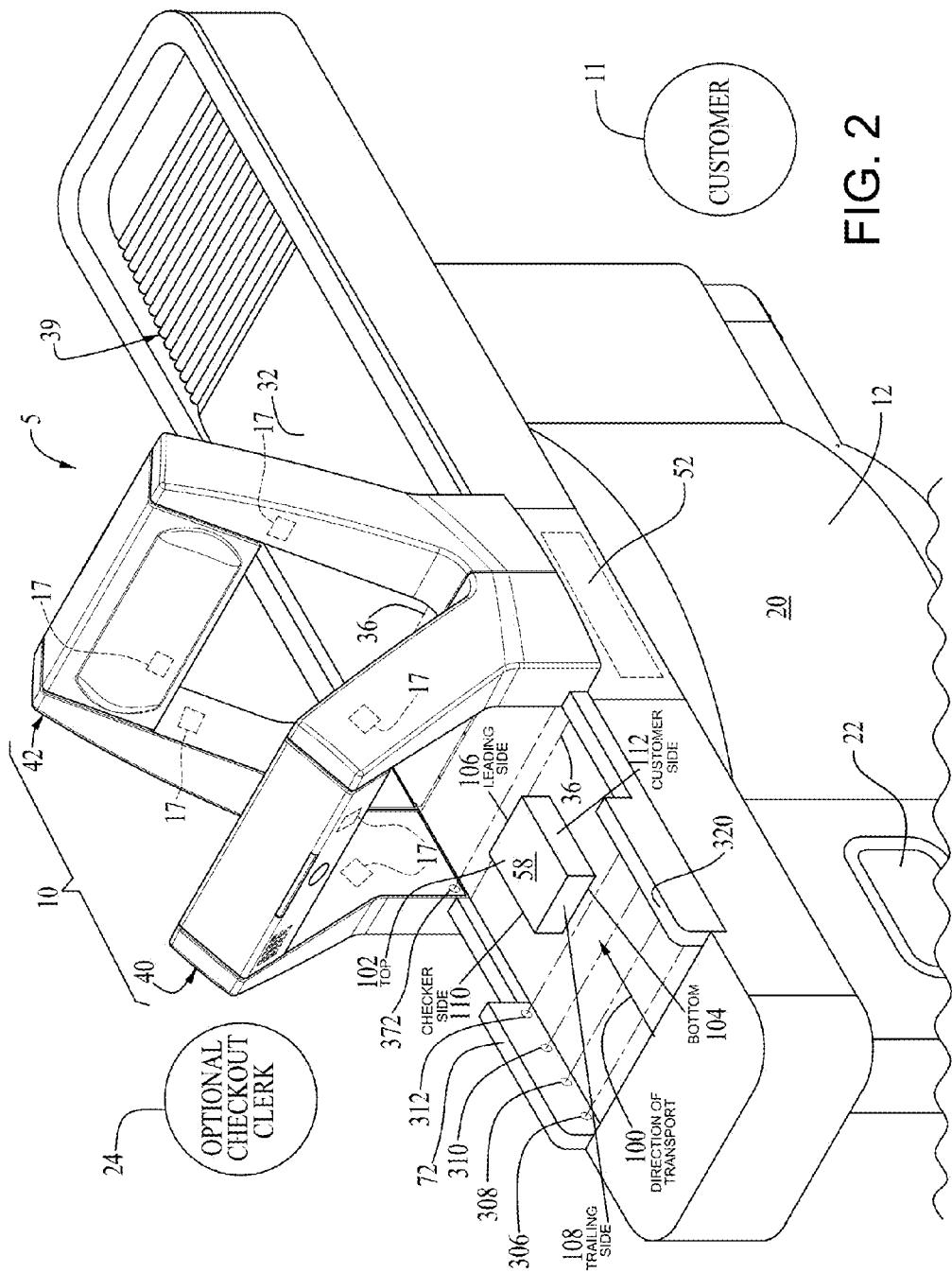
FIG. 2 is an isometric view of the automated checkstand of FIG. 1 including a box-shaped item placed on an input conveyor belt.

FIGS. 1 and 2 illustrate an automated checkstand 5 (or simply, checkstand 5) that includes a portal optical code reader 10 (reader 10) such as may be used, for example, in a high-volume retail establishment such as a grocery store or big-box store. The checkstand 5 may also be used in an industrial setting such as a parcel distribution station (e.g., a post office), but the operating embodiment will be described primarily in the context of a retail locations, with the primary user/operator being a customer 11. Details of the reader 10 are described in U.S. Patent Application No. 61/435,777, which is hereby incorporated by reference.

The checkstand 5 includes a stand 12 supporting the reader 10, an entry section 14 for conveying items to the reader 10, and an exit section 16 that receives the items processed by the reader 10. To facilitate verbal description and establish an arbitrary frame of reference with respect to the checkstand 5, the checkstand 5 includes the following sides: a customer side 20, which is a lateral side of the checkstand 5 that includes a bottom of basket detector 22; and a checker side 23, which is opposite the customer side 20. Nevertheless, because the checkstand 5 and the reader 10 enable automated self-checkout, the customer 11 may operate the reader 10 from either side 20, 23 of the checkstand 5, and no checker 24 is necessary.

An input conveyor 30 is located in the entry section 14 of the checkstand 5, on the upstream side of the reader 10. Likewise, an output conveyor 32 is located in the exit section 16, on the downstream side of the reader 10. Thus, items are placed onto the input conveyor 30, transported by the input conveyor 30 to the reader 10, passed through a read zone 36 established by imagers 17 disposed within the reader 10, and transferred away from the read zone 36 via the output conveyor 32. The entry section 14 also includes an optional shelf 38 on which items may be set prior to, and in preparation for, placement onto the input conveyor 30. After passing through the read zone 36, items are conveyed by the output conveyor 32 onto (optional) rollers defining a bagging area 39 where the items are then delivered, boxed, or bagged for removal by the customer 11.

Referring to FIG. 2, an item 58 is represented by a rectangular shaped six-sided box, such as a cereal box, that may be passed through the read zone 36 of the reader 10. The item 58 may be described with respect to its direction of transport 100 relative to the ability of the reader 10 to read certain of sides of the item 58 being passed (as moved by the conveyors 30, 32) through the read zone 36. For example, the item 58 has a top side 102, a bottom side 104, and four lateral sides 106, 108, 110, and 112. The lateral sides may be referred to as the leading side 106 (the side leading the item 58 as it is passed through the read zone 36), the trailing side 108 (the trailing side of the item 58 as it is passed through the read zone 36), the checker side 110 (due to its proximity to the optional checker 24), and the customer side 112 (due to its proximity to the customer 11).

The read zone 36 is generally defined by the confines of entry and exit data capture arches 40, 42 (or simply, arches 40, 42). The entry and exit arches 40, 42 each have internal imagers 17 positioned to obtain image data within read volumes that encompass respective areas 44, 46 (FIG. 1). The area 44 extends from the entry section 14 to the output conveyor 32, and the area 46 extends from the input conveyor 30 to the exit section 16, such that the read zone 36 is defined therebetween. For example, the entry arch 40 extends toward the entry section 14, and includes a read volume configured to capture image data from trailing sides, e.g., trailing side 108 of item 58, as they pass through the read zone 36, generally within the perimeter of area 46. The exit arch 42 extends toward exit section 16, and includes a read volume configured to capture image data from leading sides of items passing through the read zone 36, generally within the perimeter of area 44.

An optional gap 50 (FIG. 1) is located between the input conveyor 30 and the output conveyor 32. The gap 50 allows an optional bottom-surface reader 52 to read labels on an item surface that contacts and rides upon the conveyors 30, 32. Thus, the read volumes of arches 40, 42, combined with the read volume of the bottom-surface reader 52 collectively generate the read zone 36 that is designed to allow the reader 10 to potentially read all of the six surfaces of the typical box-shaped item 58 (FIG. 2). The optional bottom-surface reader 52 also contains a lateral object sensor (not shown) to detect objects passing the gap 50. The gap 50 may include an optional transparent transfer plate (not shown) that may be placed between the conveyors 30, 32 to create a smooth transition of items transported from input conveyor 30 to output conveyor 32. Alternatively, if the gap 50 is not needed for a given application, the input conveyor 30 and output conveyor 32 may comprise a single, continuous conveyor.

In the illustrated example portal optical code reader 10, the arches 40 and 42 are each in the form of inverted U-shaped structures and accommodate optics and other internal components for obtaining image data, as discussed above. The configuration of the dual arches 40, 42 creates an open architecture that provides some barrier/inhibition from a customer reaching into the read zone yet provide sight lines for allowing the customer to generally continuously observe items passing through the arches. Another suitable portal optical code reader may be constructed with more or less openness than the one illustrated.

The entry arch 40 includes a customer-side leg 60, a checker-side leg 62, and a spanning section 64 that joins the legs 60, 62. The spanning section 64 includes an indicator light projector 70 that faces and is communicatively coupled to an item-detector device 72 associated with the input conveyer 30. As described in further detail below, the indicator light projector 70 is an artificial illumination source that provides item placement feedback to the customer 11. Similarly, the exit arch 42 includes a customer-side leg 80, a checker-side leg 82, and a spanning section 84 therebetween.

The spanning or top section 64, customer-side leg 60, and checker-side leg 62 generate a light curtain 90 to detect items entering the read zone 36. Similarly, the exit arch 42 sections 80, 82, 84 form a light curtain 92 to detect items exiting the read zone 36. The light curtains 90, 92 are spaced approximately 400 mm apart to define the read zone 36. As noted, imagers 17 in the entry and exit arches 40, 42 may obtain image data from multiple directions so as to view and read optical codes on a surface of an item positioned in any orientation while it passes through the read zone 36.

In some embodiments, the reader 10 includes software executed by a processor or controller to determine or track the position of the item 58 through the read zone 36 based on dead reckoning. For example, the processor observes the times the item 58 passes the leading 90 and trailing 92 light curtains, or the times that the item 58 is detected by object sensors such as optical eyes. Based on these times and an assumed constant, predetermined velocity of the conveyor belts 30, 32, the processor can correlate optical codes read in the read zone 36 with an item, e.g., item 58, and estimate the position of the item 58. This correlation allows the reader 10 to differentiate between multiple reads of the same item, and distinguish identical labels on multiple items. Dead reckoning also allows the processor to determine the presence of multiple distinct labels on individual items (such as an overpack label for a multi-pack of items).

The present inventors have discovered that because the estimated positional information is derived from belt speed, greater uncertainty in the belt speed requires greater inter-object spacing. For example, a 1% variation in belt speed will yield a worst-case 4 mm positional error (1% of 400 mm) in the calculated position of a decoded optical code. A 10% variation will result in a 40 mm positional error. Although the reader 10 software assumes some uncertainty in the estimated item position to ensure that a decoded optical code is correctly matched to the appropriate item, the inter-item spacing distance must be sufficient for the software to correctly distinguish items.

Figure 3:
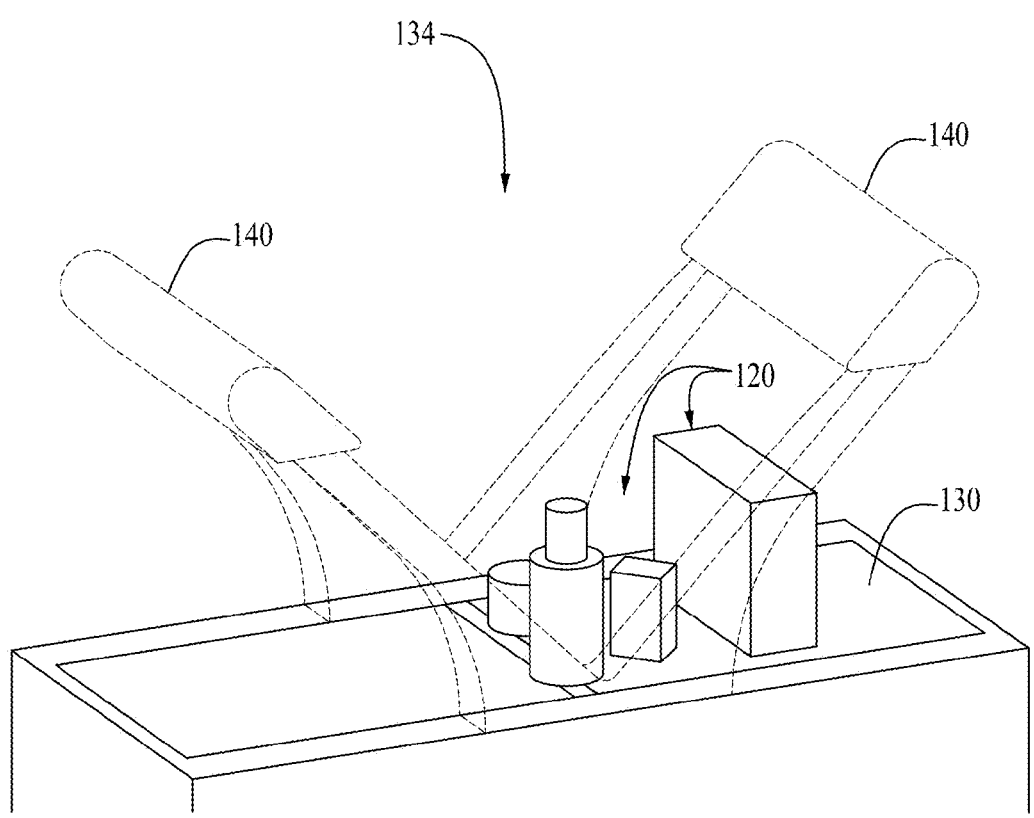
FIG. 3 is an isometric view of an automated checkstand with some items loaded on an input conveyor belt and other items entering a read zone, as seen from a point of customer egress.

FIG. 3 illustrates an example of items 120 on an input conveyor 130 of an automated checkstand 134 that are insufficiently singulated to ensure that a portal optical code reader 140 can properly correlate an optical code to its associated item due to uncertainty in position of each item. In such an event, the processor generates an exception, temporarily stops the conveyor 130, and awaits customer or checker intervention. These exceptions reduce the overall item throughput. Increasing the separation distance between items 120 would decrease the likelihood of generating an exception, but excessive separation distance also reduces throughput.

Figure 4:
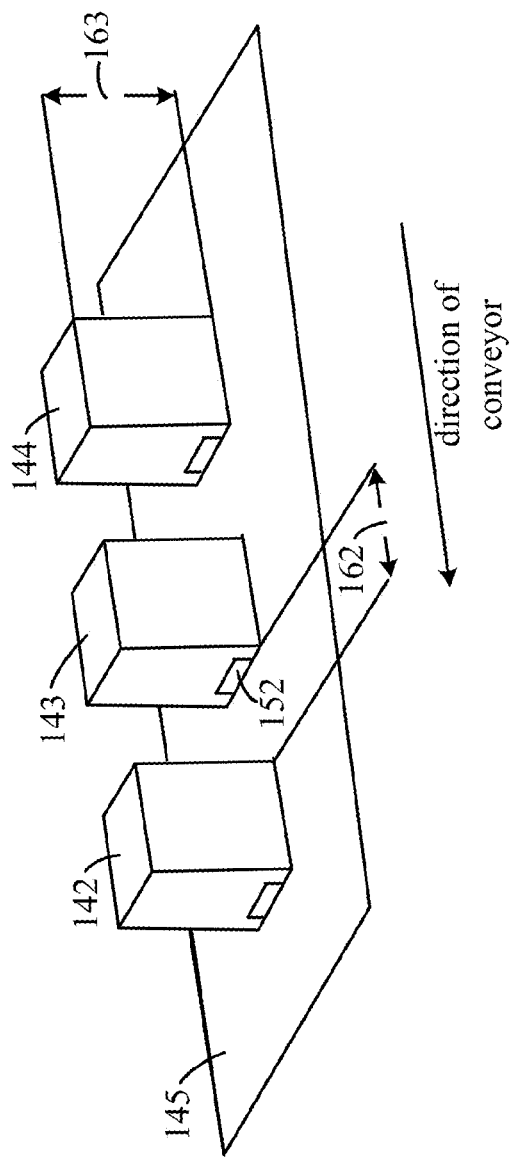
FIG. 4 is an isometric view of three similarly shaped square items that depict an example of item singulation, with the items uniformly and sequentially spaced apart on an input conveyor belt.
Figure 5:
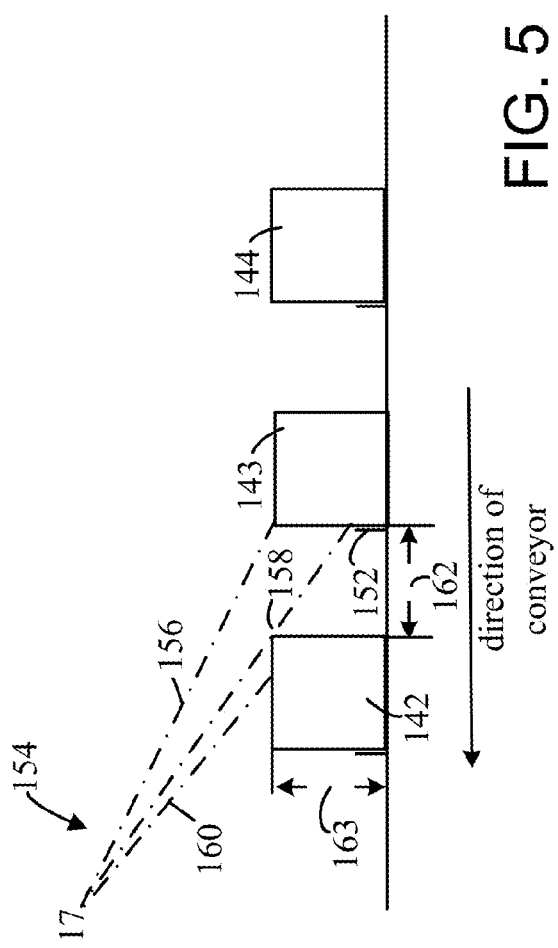
FIG. 5 is a side elevation view of the items in FIG. 4 during transport though a read volume including optical path lines that depict linear shadowing due to insufficient item singulation.

In addition to exceptions resulting from positional uncertainty, a related type of exception can result from either linear shadowing or from parallel shadowing. FIGS. 4 and 5 depict a specific type of improper item singulation resulting in linear shadowing. Linear shadowing results when items passing through a read zone occlude optical codes of subsequent items (i.e., items placed subsequently on an input conveyor).

FIG. 4 shows three box-shaped items 142, 143, 144 placed on an input conveyor 145. FIG. 5 shows an example of the first item 142 occluding an optical code 152 of the second item 143 as the two items 142, 143 are conveyed through a read volume 154. The read volume 154 (depicted with optical path lines 156, 158, 160), which in this example is associated with an imager (such as an imager 17 of FIGS. 1 and 2) in a spanning section (such as sections 64, 84 of FIGS. 1 and 2), cannot read the optical code 152 because the read volume 154 is occluded by the first item 142. The optical path line 160 is completely occluded, but would have encompassed optical code 152 if a separation distance 162 were greater, an item height 163 were shorter, or the optical code 152 were placed at another location or orientation on the item 143. In other cases, only a portion of the optical code 152 is visible to the imager in the read volume, in which case the second item 143 has some probability of being successfully read. With greater separation distance 162, the probability of a successful read increases because it is more likely the second item optical code 152 is fully visible to the imager.

FIGS. 6-8 depict an example of parallel shadowing. Parallel shadowing results when items passing through a read volume occlude optical codes of other items placed laterally in parallel across a conveyor's width. FIG. 6 shows three cylindrical items 172, 174, 176 placed across an input conveyor 177, with associated optical codes all oriented toward a lateral side of a portal optical code reader. Three rectangular items 180, 182, 184 are arranged similarly, but placed subsequent to the cylindrical items 172, 174, 176 on the input conveyor 177. As shown in FIG. 7, lateral imagers 17 located in a customer-side leg and in a checker-side leg of a portal optical code reader generate read volumes 190, 192 that encompass the cylindrical items 172, 174, 176, and may therefore successfully read an optical code 194 of the middle item 174 as it passes through the read volumes 190, 192. However, the same read volumes 190, 192 are unable to decode an optical code 196 on the middle rectangular item 182 as shown in FIG. 8 because the read volumes 190, 192 are shadowed by the rectangular item 184. Consequently, the arrangement of items in FIG. 8 generates an exception resulting from parallel shadowing, decreasing the overall throughput of the system. By communicating proper item placement to a customer, the customer is prompted to properly singulate items, resulting in reduced exceptions, optimized item spacing, and thereby increase throughput for faster checkouts.

Referring back to FIG. 1, the checkstand 5 includes an integral illumination source in the form of the indicator light projector 70 housed in the spanning 64 of entry arch 40. In some embodiments, the indicator light projector 70 may be housed in an overhead lamp, located in the sidewalls of the reader 10, or located in a separate lamp module hanging from the ceiling or surrounding walls. The indicator light projector 70 illuminates a portion or location 200 of the entry section 14 with a green-colored or other suitably colored visible light, directly showing customer 11 where to place an item. As explained below, the illumination is toggled (activated) on and off to indicate an appropriate time and location to place an item, or to indicate when there is an exception, as will be described in more detail below. In other words, the light source 70 is coupled to the item-detector device 72 to form an input pacing and item placement system.

Figure 9:
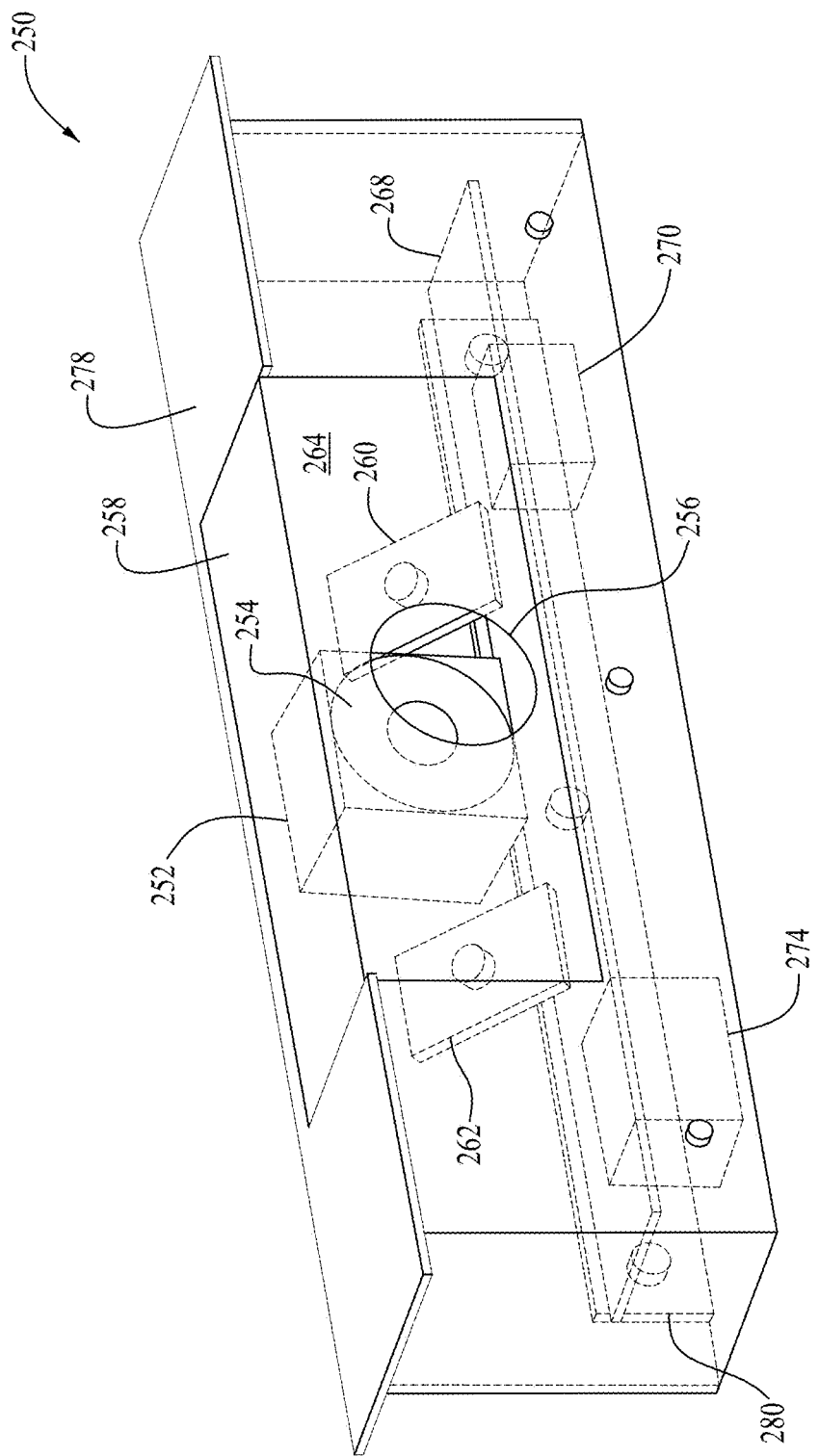
FIG. 9 is an isometric view of an input pacing indicator light and associated housing, according to one embodiment.

FIG. 9 shows an example notification system including an illumination source in the form of an indicator light projector 250. The indicator light projector 250 includes a collection of LEDs in an LED module 252. Alternatives to the LED module 252 include incandescent bulbs, lasers, or another light source suitable to project a spot or other form onto a checkstand (e.g., checkstand 5).

The indicator light projector 250 includes a lens 254 to project the well-defined circular spot (FIG. 1, location 200). In some embodiments, the projected light may be an oblong or a diffused rectangle projection. The indicator light projector 250 may also include a laser and a diffractive optic to generate text, lines, or detailed shapes. The indicator 250 optionally includes a video projection unit to generate moving projections if desired.

The indicator light projector 250 includes an aperture 256 cut through a diffusive translucent covering 258. In one embodiment, the covering 258 conceals side-LED modules 260, 262 and associated PCBs, yet still allows the light from LED modules 260, 262 to shine through a front face 264 of the covering 258.

Side-LED modules 260, 262 are mounted slightly off-axis from vertical such that when the indicator light projector 250 is mounted in a spanning section 64, the modules 260, 262 project outward, parallel to the conveyor 30, and directly in the field of vision of the customer 11 while he or she is loading items. The side orientation of side-LED modules 260, 262 is particularly suited to direct customers down a preselected side of the checkstand 5, as described in more detail with respect to FIG. 11, below. The LED modules 252, 260, 262 receive power and control signals from a PCB 268. Power is delivered through a barrel connector (not shown) inside a power-supply housing 270.

A serial bus connector, such as an RJ connector or USB connector, for sending and receiving control signals is housed in a connector housing 274. A housing 278 for mounting and concealing the components of the indicator light projector 250 is constructed with additional space to house other electronics such as a light curtain controller board 280. The board 280 contains electronic components such as the controller or processor to control and monitor the item-detector device 72 and/or the light curtains 90, 92.

In FIGS. 1 and 2, the item-detector device 72 defines a loading zone 300 on a region of the input conveyor 30. The item-detector device 72 produces a signal indicating whether an item is present in the loading zone 300. In one embodiment, the signal is activated once the loading zone 300 is clear, and any previously placed items have been transported a sufficient distance along the input conveyor 30. The indicator light projector 70 illuminates the location 200 in response to the signal so that the customer 11 knows where and when to place (i.e., singulate) subsequent items.

The item-detector device 72 (or item-detector 372) may comprise a light curtain, multiple optical-eyes, an image recognition system, a weight scale, or any suitable device to detect whether items are loaded on a region of the input conveyor 30. FIGS. 1 and 2 depict the item-detector device 72 with four optical eyes, 306, 308, 310, 312 spaced approximately three inches apart and thereby defining the loading zone 300 of approximately nine inches. The spacing between optical eyes, as well as the total number of optical eyes may be configurable to define loading zones of various lengths and responsiveness. For example, a spacing of two inches between optical eyes would be more responsive to items between two and three inches wide. Increasing the total number of optical eyes or total length of the loading zone 300 decreases the likelihood that customers will load items outside of the defined loading zone 300 and thus inadvertently circumvent the input pacing and item placement system.

FIG. 1 illustrates the illumination being focused or projected onto the location 200 of the conveyor 30, but the illumination may be directed onto or reflected from a portion of a siderail 320, shelf 38, or other locations. In some embodiments, an indicator light projector may project from beneath an input conveyor, illuminating up through a translucent belt or translucent middle strip into a loading zone. Alternatively, indicator lighting may be integrated into item-detector sidewalls or checkstand exterior sidewalls as described below with respect to FIG. 11. It should be recognized that various other means for indicating item placement may be used, including a lead-in belt constructed with thermochromic material capable of changing color upon the selective application of elevated temperature in a predetermined range. In other embodiments, various LCD arrangements may be integrated into siderails, or other item-placement techniques are possible.

FIG. 1 shows the indicator light projector 70 projecting into the loading zone 300 region while there are no items on the input conveyor 30. FIG. 2 shows the indicator light projector 70 deactivated while the item 58 exits the loading zone section 300. FIG. 2 illustrates that the portion 200 is not illuminated because the item 58 has just exited the loading zone 300 and there is insufficient space to properly singulate a subsequent item. As the item 58 continues to move down the conveyor 30, the indicator light projector 70 will re-illuminate the portion 200 to signal to the customer 11 to place a subsequent item. According to one embodiment, the indicator light source 70 is hardwired to a solid-state relay that activates the indicator light projector 70 whenever an item leaves the loading zone 300, i.e., whenever there are no optical eyes blocked. In another embodiment, the indicator light projector 70 is configured to activate after some fixed delay after the item-detector device 72 becomes unblocked, i.e., no items are in the loading zone 300. The delay time is a function of the input conveyor 30 speed. For example, with an average belt speed of 12 inches per second, and a desired item spacing of 4 inches, the delay or singulation time is one-third of a second. Accordingly, the indicator light projector 70 would activate approximately 0.33 seconds after an initial item is conveyed beyond the item-detector device 72, while the optical eyes are unblocked.

According to another embodiment, a processor or controller executing a program calculates delay times dynamically based on average belt speed and customer loading speed. A processor- or microcontroller-based pacing system may be used to store a customer's previous loading times, and this loading behavior data may be used for dynamically controlling belt speeds. For example, when the processor detects a customer with faster item loading times, the processor may, in response, dynamically increase the belt speed to reduce delay times. Alternatively, for a slow-loading customer, the belt speed may (optionally) be reduced to provide a less hectic loading pace, while still maintaining minimum item spacing. In either scenario, the item-detector device 72 and the processor may function as a front-end data gathering system for automated checkstand control software.

In another embodiment, two item detectors are used to toggle the indicator light projector 70 independent of belt speed. The first item-detector device 72 defines a loading zone as described above, while a second item-detector device 372 is used to directly switch the indicator light projector 70 on or off. According to this embodiment, the second item-detector device 372 (e.g., a single optical eye) is placed a predetermined item-separation distance away from the loading zone 300. For example, with an item spacing distance of 12 inches, the second item-detector device 372 is placed at least 12 inches away from the loading zone 300. Based on input from the second item-detector device 372, the indicator light projector 70 projects green light whenever there are no items detected in the loading zone 300 and the second item-detector device 372 is unblocked. If either the first 72 or second 372 item detectors are blocked, the indicator light projector 70 is deactivated or switched to flash, or to another color (i.e., yellow). However, if the first 72 and second 372 item detectors are both blocked, the indicator light projector 70 projects red light, thereby indicating that items are not spaced at least 12 inches apart.

Figure 10:
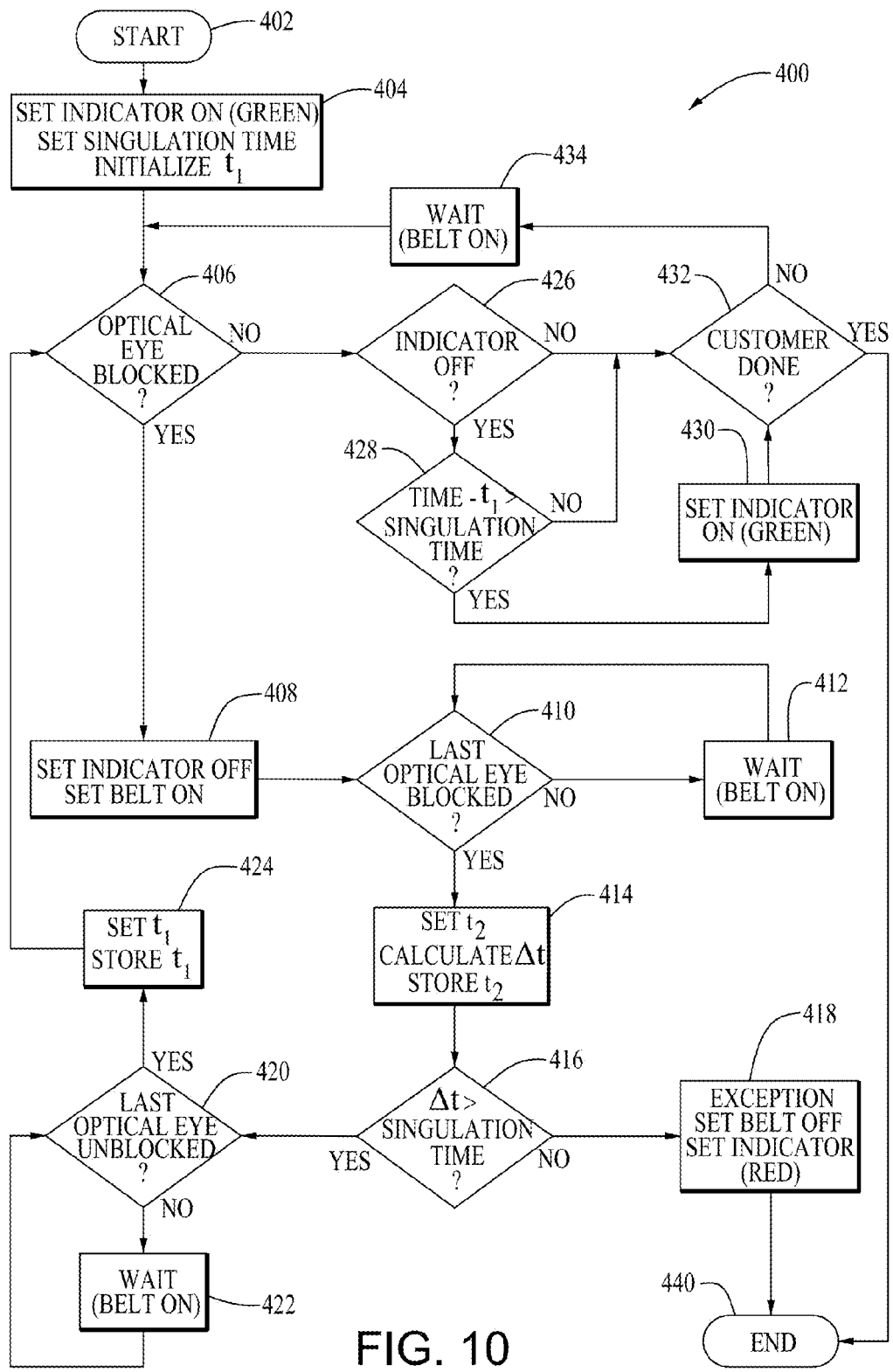
FIG. 10 is a flow diagram depicting operation of an input pacing system, according to one embodiment.

FIG. 10 is a flow chart of a process 400 for controlling the item-detector device 72 and indicator light projector 70 of FIGS. 1 and 2. The process 400 includes the following steps:

Step 402: Starting the process.

Step 404: Turning on the indicator light projector 70 with a green light projecting onto the loading zone section 300 of the input conveyor belt 30. The conveyor belt 30 is stopped and awaiting the customer 11 to start loading items. An internal timer, $t_1$, is initialized to the previous time the last optical eye 312, i.e., the optical eye closest to the reader 10, was unblocked. The desired item singulation time is set based on a preconfigured belt speed. Alternatively, the singulation time may be set dynamically based on actual measured belt speed. The process 400 advances to step 406.

Step 406: Polling (or receiving a signal from) the item-detector device 72 to check if an optical eye has been blocked. If an eye is blocked, the process 400 advances to Step 408. If an eye is not blocked, the process 400 advances to Step 426.

Step 408: Deactivating indicator light projector 70. The item-detector device 72 has detected an item in the loading zone 300 so the indicator light projector 70 is turned off, the belt is turned on, and the process 400 advances to Step 410.

Step 410: Polling the item-detector device 72 checking whether the last optical eye 312 is blocked. The last optical eye 312 is responsible for setting indicator light delay timers. If the last optical eye 312 is not blocked, the process 400 advances to Step 412.

Step 412: Moving the detected item closer to the last optical eye 312. Step 412 then proceeds back to Step 410 to recheck the last optical eye 312. If the last optical eye 312 is now blocked, the process 400 advances to Step 414.

Step 414: Storing the time when the last optical eye 312 became blocked as $t_2$. Step 414 computes $\Delta t$, which is the difference between $t_2$ minus $t_1$, and then the process 400 advances to Step 416.

Step 416: Verifying whether $\Delta t$ is greater than the calculated or desired singulation time from Step 404. If $\Delta t$ is greater than the singulation time, there has been sufficient distance between consecutive items and the process 400 proceeds to Step 420. Conversely, if $\Delta t$ is not greater than the singulation time, the process 400 advances to Step 418.

Step 418: Indicating that there is insufficient spacing between items. The process 400 stops the belt and/or turns on (or flashes) red light from the indicator light projector 70. The process 400 proceeds to Step 440 and ends.

Step 420: Polling the item-detector device 72 checking whether the last optical eye 312 is unblocked. If the last optical eye 312 is blocked, the process 400 advances to Step 422.

Step 422: Moving the detected item away from the last optical eye 312. Step 422 then proceeds back to Step 420 to recheck the last optical eye 312. If the last optical eye 312 is now unblocked, the process 400 advances to Step 424.

Step 424: Setting $t_1$ as the time when the last optical eye 312 became unblocked and storing the value. The process advances to Step 406.

Step 426: Checking whether the indicator light projector 70 is off. If the light is off, the process 400 advances to step 432, otherwise the process 400 advances to Step 428.

Step 428: Calculating whether sufficient time (i.e., singulation time) has elapsed since the last item left the loading zone 300 such that the indicator light projector 70 may be turned on. If enough time has elapsed, the process 400 advances to Step 430, otherwise the process 400 advances to Step 432.

Step 430: Setting the indicator light projector 70 on and projecting green light to indicate the system is ready for another item. The process 400 then advances to Step 432.

Step 432: Determining whether the customer 11 has completed loading items. The customer 11 is done loading items when the payment process is commenced or after a sufficient time has elapsed since the last item was loaded. If the customer 11 is done, the process 400 is completed at Step 440. If the customer 11 is not done loading items, the process 400 advances to Step 434.

Step 434: The process 400 advances the belt and returns to Step 406 to continue polling the item-detector device 72.

Step 440: Ending the process.

Figure 11:
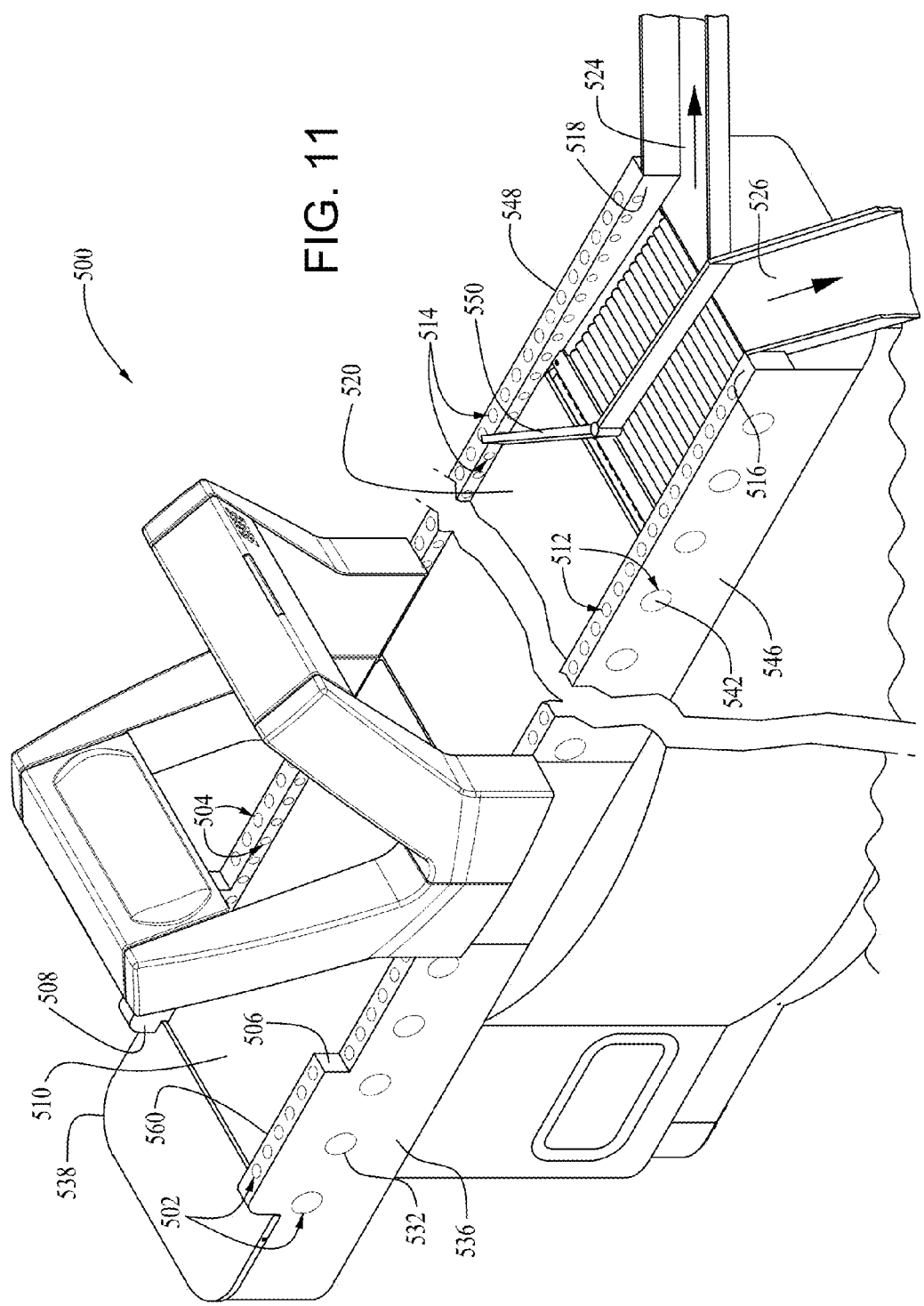
FIG. 11 is an isometric view of an automated checkstand including integral lateral and siderail artificial illumination sources, according to one embodiment.

FIG. 11 depicts another embodiment of an input pacing and item placement system for an automated checkstand 500 that includes integral illumination 502, 504 in the form of running lights integrated into fixed siderails 506, 508 bordering an input conveyor 510. Integral illumination 512, 514 (optionally) extends to siderails 516, 518 bordering an output conveyor 520 leading to bagging areas 524, 526. The checkstand 500 illustrated in FIG. 11 also includes (optional) lighting 532 integrated into lateral sides 536, 538 of the checkstand 500. Integral illumination 542 (optionally) extends to lateral sides 546, 548.

Although the checkstand 500 in FIG. 11 is depicted with lighting in both sides 536, 538, as well as in siderails 506, 508, 516, 518, it should be recognized that various illumination configurations may be implemented. In one example, only the illumination 502, 504 on the siderails 506, 508 next to the input conveyor 510 are included. Alternatively, the illumination 512, 514 may extend to bagging areas 524, 526, but not on the checkstand sides 536, 538. In another embodiment, the illumination 532 is provided on the lateral sides 536, 538 on the front half of the checkstand instead of the siderails 506, 508, 516, 518. In some embodiments, illumination 542 on the lateral sides 546, 548 extends to bagging areas 524, 526, or other locations on the checkstand 500. The illumination depicted in FIG. 11 includes multi-colored (e.g., tri-colored) or separate primary colored LEDs housed in cans, covered with light diffusing caps or lenses; however, any light source capable of independently illuminating segments of the checkstand 500 may be used, including rope lighting, segmented fiber optic lighting, or incandescent bulbs.

The checkstand 500 in FIG. 11 includes the example split bagging areas 524, 526 that are alternated with a motor-driven swinging gate 550. Because there are two bagging areas, subsequent customers can freely use the checkstand 500 without mixing their items with a previous customer's items that may still be located in a bagging area. The motor-driven swinging gate 550 acts as an item-detector device, or a separate item-detector device provides a signal to the processor in the checkstand 500 that indicates which side of the checkstand 500 the previously read items are located. Sequentially flashing lights among the various integral light sources on the checkstand 500 indicate which side the customer should proceed to exit to find their previously read items.

The lighting depicted in FIG. 11 may also provide an ability to indicate various error conditions, checkstand state information, and item placement exceptions with colored indicator lights in regions of the checkstand associated with the errors or exceptions. For example, flashing yellow lights on a side of the checkstand may indicate to a checker that assistance is required at that location. Solid yellow lights in the front of the checkstand may indicate the checkstand is in a system standby mode. Solid or flashing red lights on the entire checkstand may indicate the system is down. Maintenance modes are indicated with other flashing combinations, including lights forming a progress bar indicating status of a software download or debugging session.

The lighting of FIG. 11 may also be configured as a notification system that activates to communicate various feedback or instructions to customers. As described above with reference to the checkstand 5 of FIGS. 1 and 2, the lighting of the checkstand 500 may also indicate appropriate times to place items on the input conveyor belt 30. In the checkstand 500, the timing and placement location is indicated with green indicator lights bordering an item-detector device 560 that defines a loading zone as previously described.

Figure 12:
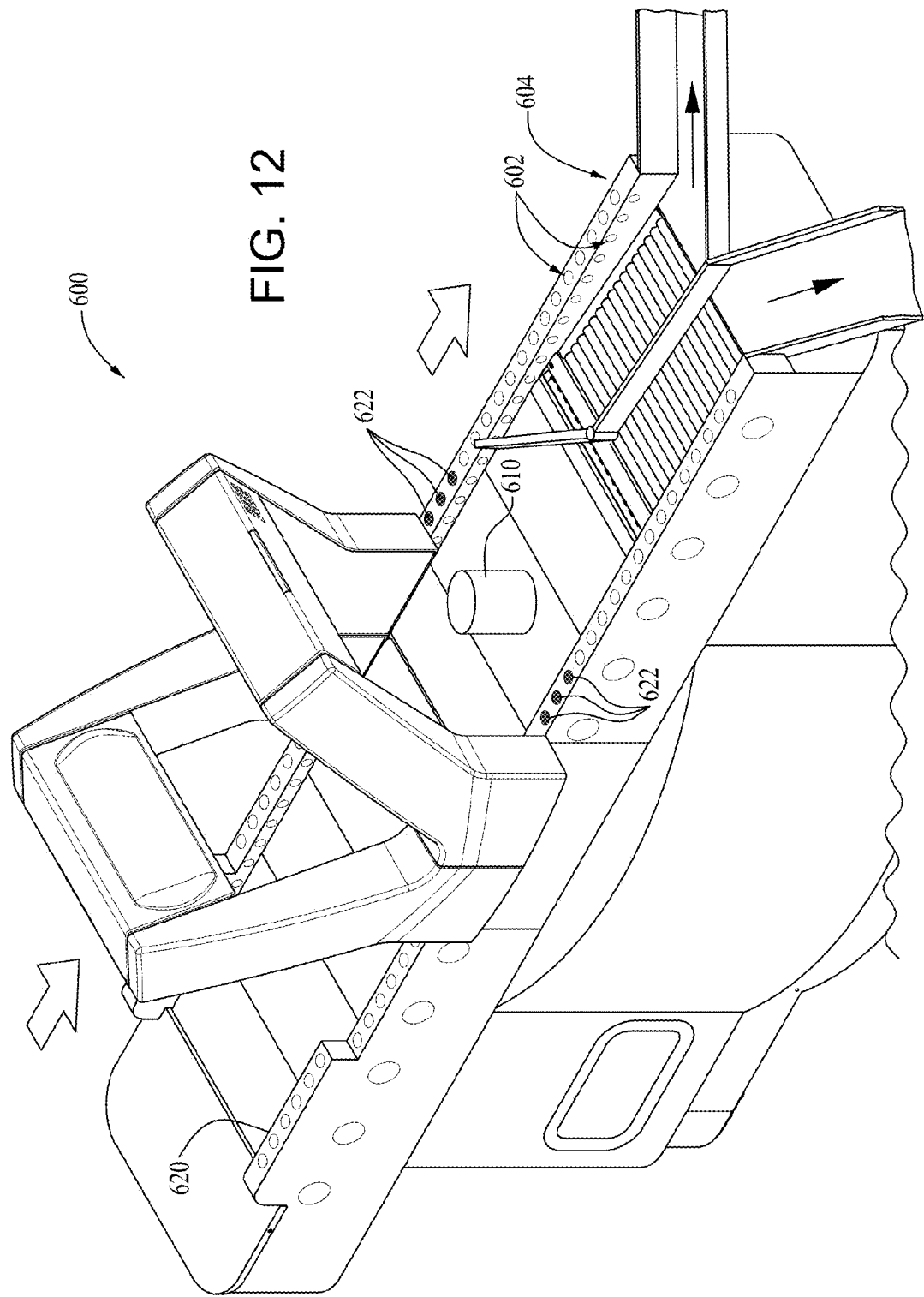
FIG. 12 is an isometric view of an automated checkstand with an artificial illumination source indicating an item was not successfully read.

As shown in a checkstand 600 of FIG. 12, integral siderail lighting 602 extends into a takeaway zone 604 and can be used to provide a "good read" indication to a customer or other person monitoring the success or failure of the optical code reads. When a customer places an item 610, and it is detected by an item-detector device 620, the checkstand 600 sequentially illuminates a yellow light or multiple lights 622 on siderails to follow and indicate the position of the item 610 as it is conveyed. In other words, the active lights 622 track the position of the item 610 as it moves. In some embodiments, the active lights 622 may track item separators placed across a conveyor beside an item.

In another embodiment, the siderail lighting 602 illuminates a single light closest to an estimated center position of the item 610. Once the optical code of the item 610 is read, either the color of the lighting switches to green indicating a successful read of the optical code, or the color switches to red indicating the item 610 was not successfully read. The lighting continues to track the position of the item 610 in either red or green as the item moves into the selected bagging area. Checkers can readily identify an item needing to be rescanned based on the color of the corresponding siderail lights. As described above, position is tracked with dead reckoning, or in other embodiments, image recognition cameras, weight detectors, optical eyes, or other tracking techniques.

Figure 13:
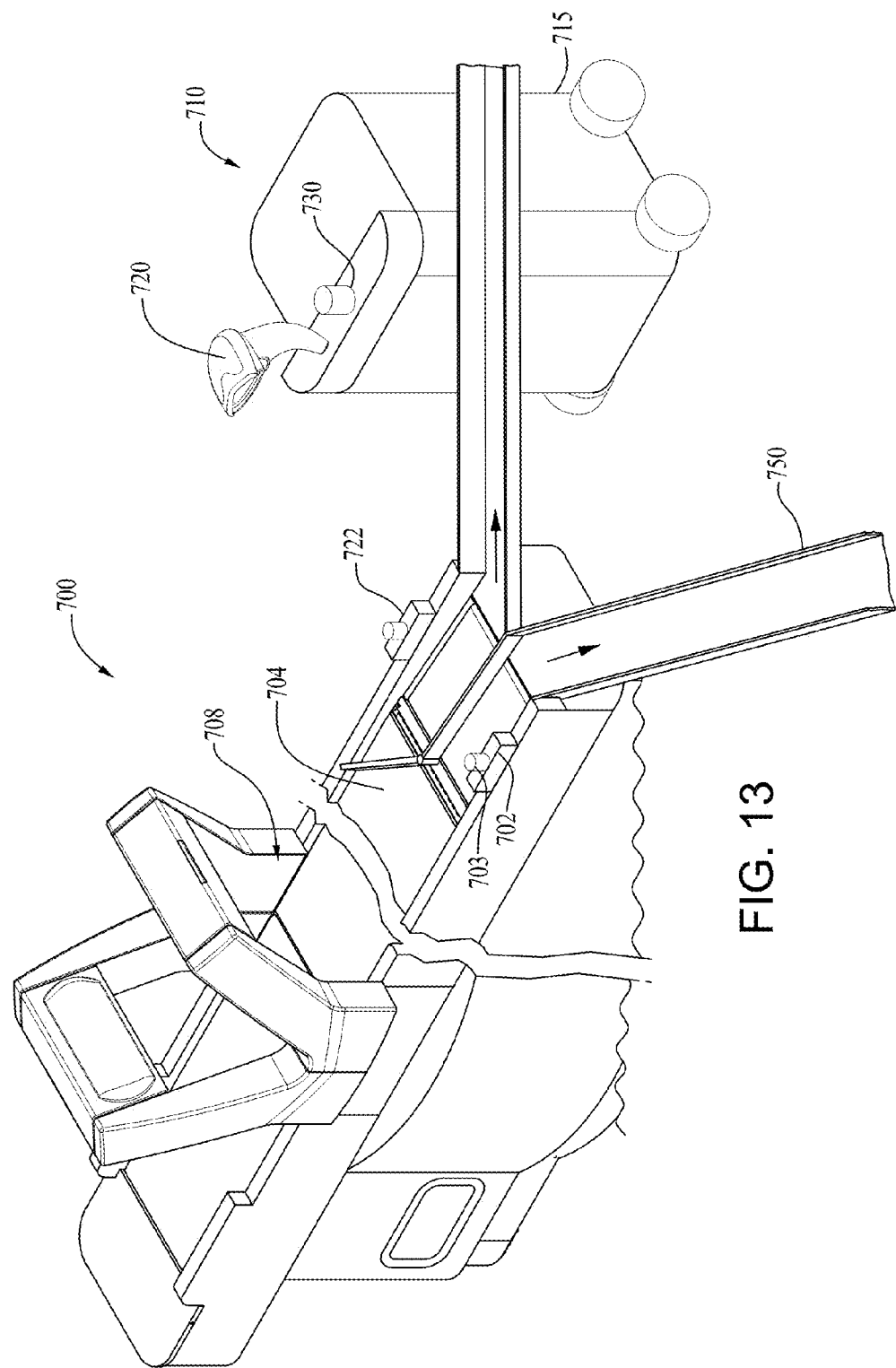
FIG. 13 is an isometric view illustrating a movable indicator and an exception-clearing station positioned at locations observable by a user monitoring the movable indicator.

FIG. 13 illustrates a checkstand 700 according to another embodiment including a movable indicator 702 configured to indicate various exceptions, successful reads, or other checkstand status information using an artificial illumination source 703 as described above. According to one embodiment, the moveable indicator 702 receives from the checkstand 700 positional information associated with items. The positional information tracks the items as they are transported along a conveyor 704. This positional information is determined according to various techniques, such as those described previously. By tracking the position of items, the moveable indicator 702 may then illuminate the illumination source 703 or emit an audible tone (i.e., activate) when an item approaches the moveable indicator 702. The activation of the movable indicator 702 can be used to indicate whether an item previously generated an exception, or in some embodiments, whether the item was successfully read.

In some embodiments, the checkstand 700 is configured to store a position of the moveable indicator 702, and provide the movable indicator 702 an activation signal when an item is estimated to arrive at the movable indicator 702. In another embodiment, the moveable indicator 702 receives an activation signal irrespective of the location of the moveable indicator 702 whenever an exception occurs in order to alert users that are standing away from a read zone 708. The users standing away from the read zone 708 can then use a mobile exception clearing station 710 having a cart 715 and a handheld optical code reader 720 (or other portable data terminal or device capable of reading data) to re-read the optical code (i.e., clear the exception) when the item arrives at the station 710, without returning the item through the read zone 708.

Although the moveable indicator 702 is shown positioned on a siderail of the checkstand 700, it may be placed anywhere that is convenient for monitoring the checkstand 700. The checkstand 700 may also include several movable indicators, for example, a moveable indicator 722 is shown opposite the movable indicator 702, and another moveable indicator 730 is included on the station 710. Each moveable indicator 702, 722, 730 may be configured to indicate a different type of status information at various monitoring locations. For example, a moveable indicator (not shown) may be placed at the end of a long parcel chute 750 to indicate the location of items ready for bagging.

It is intended that subject matter disclosed in some portions herein can be combined with the subject matter of one or more of other portions herein, provided such combinations are not mutually exclusive or inoperable. In addition, many variations, enhancements, and modifications of the concepts described herein are possible. Thus, it will be obvious to skilled persons that many changes may be made to the details of the above-described embodiments without departing from the underlying principles of the disclosure. The scope of the present invention should, therefore, be determined only by the following claims.

The invention claimed is:

1. An automated checkstand comprising:
   a data reader defining a read zone through which items to be read are conveyed;
   a conveyor system configured to transport items through the read zone;
   a loading zone configured to receive items for conveyor transport through the read zone; and
   a user-notification system including an illumination source configured to selectively illuminate a portion of the automated checkstand at least partly outside the read zone, the user-notification system configured to activate the illumination source in response to positional information associated with items placed on the conveyor system and thereby indicate, using emission of visible light from the illumination source, the positional information to a user adjacent the automated checkstand.

2. The automated checkstand according to claim 1, further comprising:
   a fixed siderail bordering the loading zone, and in which the user-notification system comprises running lights housed within the fixed siderail.

3. The automated checkstand according to claim 2, further comprising:
   a bagging area including at least first and second separated bagging sections, in which the running lights extend to the bagging area, and the running lights are configured to selectively illuminate a side of the automated checkstand that corresponds to the bagging section that contains items transported through the read zone.

4. The automated checkstand according to claim 2, in which the running lights comprise multi-colored LEDs integral within the fixed siderail.

5. The automated checkstand according to claim 4, in which one or more of the multi-colored LEDs are configured to sequentially activate and illuminate a portion of the fixed siderail that corresponds to the positional information of an item that generates an exception occurring in the read zone.

6. The automated checkstand according to claim 1, in which the user-notification system comprises a moveable indicator that is positionable on multiple different locations of the automated checkstand and is communicatively coupled to the data reader.

7. The automated checkstand according to claim 6, in which the moveable indicator is configured to activate in response to an item generating an exception occurring in the read zone.

8. The automated checkstand according to claim 7, in which the moveable indicator emits a visible or audible signal in response to being activated.

9. The automated checkstand according to claim 1, further comprising:
an exception-clearing station including a handheld data reader and including a moveable indicator communicatively coupled to the automated checkstand, the moveable indicator configured illuminate in response to an item generating an exception occurring in the read zone.

10. The automated checkstand according to claim 1, further comprising:
an item-detector device configured to detect items within the loading zone, and in which the selectively illuminated portion of the automated checkstand includes at least a portion of the loading zone defined by the item-detector device, and the illumination source is configured to selectively illuminate the portion of the automated checkstand according to a desired inter-item separation distance between successive items detected by the item-detector device within the loading zone.

11. The automated checkstand according to claim 1, further comprising:
an item-detector device operable to obtain a position of an item placed within the loading zone, in which the positional information is calculated using conveyor speed and the position obtained by the item-detector device.

12. The automated checkstand according to claim 11, in which the item-detector device comprises an optical eye.

13. The automated checkstand according to claim 1, in which the positional information is derived based on multiple spaced apart item-detector devices.

14. The automated checkstand according to claim 1, in which the user-notification system is configured to produce an indication of an exception occurring in the read zone, the indication including the visible light emitted from the illumination source, in which the visible light is substantially red in color.

15. The automated checkstand according to claim 1, further comprising:
first means for detecting placement of items within the loading zone;
second means for detecting items transported from the loading zone to the read zone; and
a controller configured to dynamically activate the illumination source to illuminate a portion of the loading zone in response to the first and second detecting means indicating transport of placed items from the loading zone to the read zone, and the controller further configured to dynamically adjust illumination timing based on locations of previously placed items, thereby signaling to a user appropriate times to place additional items.

16. The automated checkstand according to claim 1, further comprising:
a siderail bordering the loading zone, and in which the user-notification system comprises illumination sources disposed on or in the siderail bordering the loading zone.

17. The automated checkstand according to claim 1, further comprising:
a bagging area;
a siderail bordering the bagging area, and in which the user-notification system comprises illumination sources disposed on or in the siderail bordering the bagging area.

18. The automated checkstand according to claim 1, further comprising:
lateral sides of the automated checkstand, and in which the user-notification system comprises illumination sources disposed on or in the lateral sides.

19. The automated checkstand according to claim 1, in which the illumination source is configured to illuminate a portion of the loading zone.

20. An automated checkstand comprising:
a data reader defining a read zone through which items to be read are conveyed;
a conveyor system configured to transport items through the read zone;
a loading zone configured to receive items for conveyor transport through the read zone;
a bagging area; and
a notification system including running lights on opposing sides of the automated checkstand and extending from the loading zone to the bagging area, the running lights configured to selectively indicate one of the opposing sides that corresponds to a location of the bagging area that contains items transported through the read zone.

21. An automated checkstand comprising:
a data reader defining a read zone through which items to be read are conveyed;
a conveyor system configured to transport items through the read zone;
a loading zone configured to receive items for conveyor transport through the read zone; and
a moveable indicator that is positionable on multiple different locations of the automated checkstand and is communicatively coupled to the data reader, the moveable indicator including an illumination source configured to selectively illuminate a portion of the automated checkstand at least partly outside the read zone in response to positional information associated with items placed on the conveyor system.

22. A method of operation for an automated checkout system comprising the steps of:
receiving items within a loading zone of the automated checkout system;
transporting the items via a conveyor system from the loading zone to a read zone of a data reader;
determining positional information associated with items previously placed within the loading zone; and
activating a user-notification system including an illumination source, the activating of the user-notification system including selectively illuminating a portion of the automated checkout system at least partly outside the read zone in response to the positional information associated with the items previously placed within the loading zone thereby indicating, using emission of visible light from the illumination source, the positional information to a user adjacent the automated checkstand.

23. The method claim 22, further comprising the steps of:
  detecting presence of items received within the loading zone;
  deactivating the illumination source in response to detecting an item within the loading zone; and
  reactivating the illumination source based on positional information associated with the item, the positional information based on an item-detector device and a conveyor speed.

24. The method claim 22, further comprising the step of:
  providing illumination on a portion of the automated checkstand corresponding to a location of items previously transported through the read zone and available for takeaway.

25. The method claim 22, further comprising the step of:
  providing illumination on a portion of the automated checkstand corresponding to a location of items that generate an exception in the read zone.

26. The method claim 22, further comprising the step of:
  adjusting a transport speed of the conveyor based on user loading speed.

27. The method claim 22, further comprising the step of:
  adjusting illumination timing of the user-notification system based on user loading speed.

28. The method claim 22, further comprising the step of:
  adjusting illumination timing to indicate a pace at which the items should be loaded onto the conveyor system.

29. A method of indicating a desired inter-item separation distance between successive items placed onto a conveyor system of automated checkout system comprising the steps of:
  detecting an item within a loading zone of the automated checkout system;
  transporting the item via the conveyor system from the loading zone to a read zone of a data reader;
  determining when the item has been transported a desired inter-item separation distance away from the loading zone; and
  activating a notification system including an illumination source that selectively illuminates a portion of the loading zone in response to the determining step.

* * * * *